June 25, 1946.  N. P. MILLAR  2,402,904
POWER FACTOR METER
Filed Sept. 22, 1944
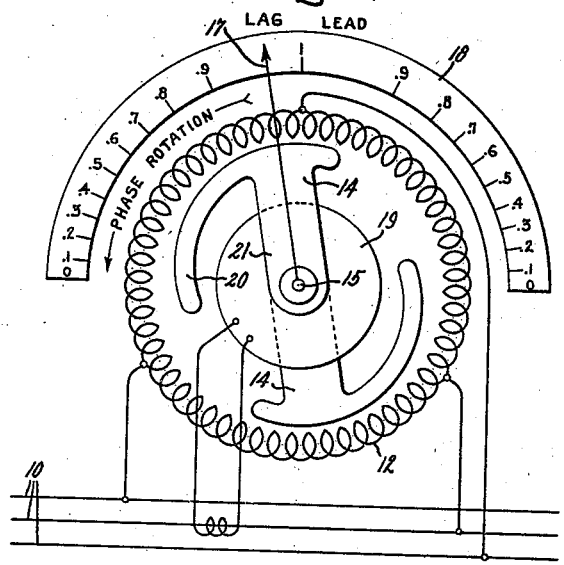
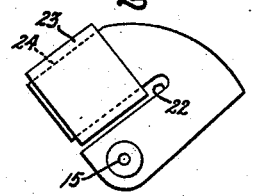
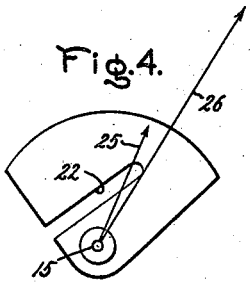
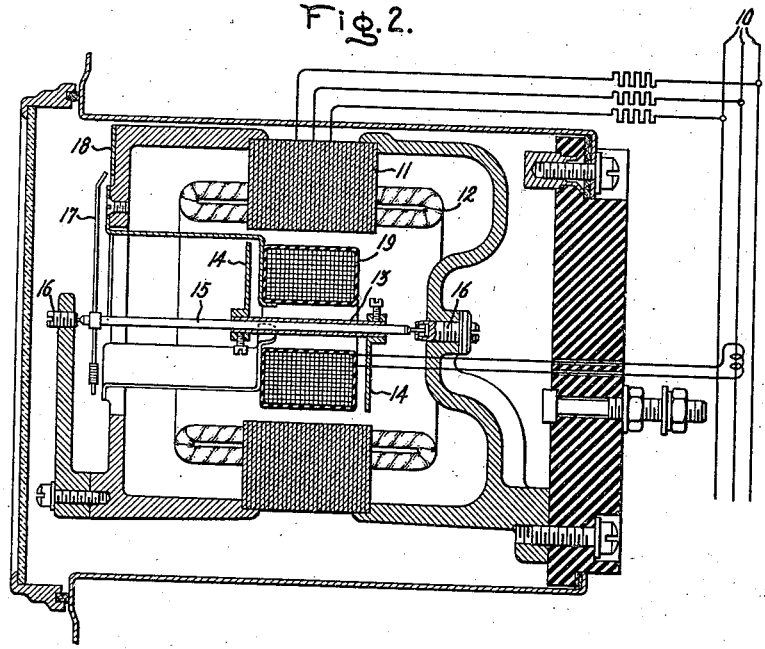
Inventor:
Norval P. Millar,
by Harry E. Dunham
His Attorney.

Patented June 25, 1946

2,402,904

UNITED STATES PATENT OFFICE 2,402,904

POWER FACTOR METER

Norval P. Millar, Swampscott, Mass., assignor to General Electric Company, a corporation of New York Application September 22, 1944, Serial No. 555,348

5 Claims. (Cl. 172—245)

My invention relates to polyphase power factor meters of the magnetic vane type, and its object is to reduce materially the error in such meters which is due to motoring torque between the rotating polyphase voltage field and the relatively stationary magnetic vane which is magnetized by the current winding.

The features of my invention which are believed to be novel and patentable will be pointed out in the claims appended hereto. For a better understanding of my invention, reference is made in the following description to the accompanying drawing in which Fig. 1 represents a face end view of the important features of a power factor meter embodying my invention; Fig. 2 represents a cross-sectional view of a power factor meter such as represented in Fig. 1, and Figs. 3 and 4 are modified forms of magnetic vane elements for use in such power factor meters for reducing the error caused by motoring action.

Referring to Figs. 1 and 2, 10 represents a three-phase power circuit the power factor of which it is desired to measure. The power factor meter comprises a stator 11 having a conventional three-phase winding 12 connected in star or delta to the three phases of the power circuit, and hence produces a three-phase rotating magnetic field the phase rotation of which is assumed to be counterclockwise as indicated in Fig. 1. The rotor comprises a tubular magnetic core part 13 (see Fig. 2) at the two ends of which are magnetic vanes 14 projecting from the core 13 at right angles thereto and in opposite directions therefrom in planes perpendicular to the axis of rotation. The core 12 is concentric to and is secured to and rotates with the shaft 15. In fact, the shaft might be made of magnetic material and have suitable dimensions to serve as such core. The rotating element is pivoted in suitable bearings 16 and the shaft carries a balanced pointer 17 indicating on a power factor scale 18. Surrounding the core part 13 and preferably stationary is a current coil 19 energized by or in proportion and in fixed phase relation to the current in one phase of the power circuit 10. The example represented assumes that the polyphase line current is balanced or substantially balanced. The current coil 19 thus produces an alternating flux in core 13 and in the magnetic vanes 14 in fixed phase relation with the line current in the selected phase. The two-pole rotor field thus reverses in polarity in synchronous relation with the two-pole rotating magnetic field produced in the stator, and since the two fields are closely inductively related by the construction, the rotor takes such position in the stator field as to have the alternating flux in its magnetic vanes line up with the two-pole alternating field of the stator. Thus when the upper vane in Fig. 1 is of north polarity, it seeks a position adjacent to the south pole in the stator, and since these poles reverse in synchronism, the rotor does not rotate with the rotating stator field and shifts its position only as the phase relation of these fields varies. Thus the rotor takes different positions for different power factors of the circuit 10 and scale 18 is calibrated with the different rotor positions as indicated by the pointer 17 in terms of such power factor as represented. Except for the shape and disposition of the rotor magnetic vanes 14, the power factor meter represented is of conventional well-known construction and operation. The particular form of casing and supporting structure is not important and while represented will not be described.

Such instruments as heretofore built and used have an error which varies with the magnitude of the current flowing in coil 19. The error is caused by varying motor torque or a varying relation between motor torque and power factor positioning torque. It seems that the rotating magnetic field of the stator has heretofore produced a torque on the magnetic vane rotor tending to produce a rotation in the direction of stator field phase rotation. This torque is small as compared to the power factor positioning torque and only causes a small movement of the pointer away from the true power factor indicating position in the direction of stator field phase rotation and if these two torques, namely power factor rotor positioning torque and motor rotating torque, were always of the same relative magnitude, the error would be constant and could be calibrated out in the scale markings provided the instrument were always connected up with the same stator phase rotation. However, it was found that in the conventional instrument the error varied with the current in current coil 19 by as much as 5% for current variations between 20 and 100% normal at the 0.5 power factor point and was greater at lower power factors. Apparently with a low current in coil 19 the power factor positioning torque is low and also the vanes have a lower degree of saturation allowing greater opportunity for the development of hysteresis motor torque, whereas with high current in coil 19 these conditions are reversed. In the prior instruments the vanes were usually in the shape of the sector of a circle as shown for example, in United States Patent No. 2,188,785 to Hall, January 30, 1940. I have found that the error above referred to can be reduced very materially by the use of magnetic vanes shaped and arranged as shown in Figs. 1, 3, and 4.

In Fig. 1 the vanes are shaped somewhat like a sickle with the blade or rim portion 20 extending from the handle or spider portion 21 in the direction of stator phase rotation. Also the rim portion has a reduced cross section as compared to the spider portion and the open end of the rim portion has a smaller radius than where it joins with the spider portion.

The vane of Fig. 3 is generally sector-shaped but has a deep slot 22 separating the spider arm from the main body of the sector except near the rim section. A flat shading coil 23 with its axis tangent to a circle whose center is the axis of rotation surrounds the nonspider portion of the vane and the outer edge of the vane at 24 beneath this shading coil is cut off straight parallel with the slot 22. In using this vane the left or slotted edge faces in the direction of stator phase rotation.

The rotor of Fig. 4 is quite like that of Fig. 3 except that the shading coil is omitted. The outer periphery of this vane (Fig. 4) is curved and the left edge which faces in the direction of stator phase rotation has a slightly smaller radius than the spider edge.

The reason why these vanes materially reduce the error previously explained is not entirely clear and while I do not wish to be bound by any theory, the following possible explanation is given. As the flux in the vane increases with increase in the current of the coil 19, the direction of the major axis of this current flux, which is generally radial in the vanes, apparently shifts somewhat clockwise in the vane or against the direction of stator phase rotation and hence the vane itself tends to move a corresponding amount counterclockwise and so offsets or compensates in large measure for the error heretofore caused by a shifting of the rotor clockwise with increase in current. For example, in Fig. 4 let the vector 25 represent the center of radial current flux at a low current value and 26 the center of flux at a much higher current value. The shift in the radial flux center could be due to higher flux density and reluctance in the reduced section of the vane at the end of the slot 22. It is evident that the tendency of both vectors to line up with a fixed point on the stator will tend to shift the vane in a counterclockwise direction as the flux increases and in a clockwise direction as the flux decreases. This tendency will oppose a shift in the rotor position due to a counterclockwise motoring torque, the effect of which decreases with an increase in such flux.

The difference between the compensation effected by the vanes of Figs. 3 and 4 is small. The use of the shading coil of Fig. 3 tends to make the reduced compensated error uniform throughout the scale range, while the vane of Fig. 4 has a minimum compensating effect at low power factors, but even at the lower power factor points the error is reduced by more than 50%. With the vanes of Fig. 1 it may be that at the higher vane fluxes the entire reduced rim section of the vanes becomes more or less saturated, causing a desired change in the relation of the torques present. In any event, this type of vane reduces the error in question in excess of 50% at all power factors.

The invention has been explained as applied for a counterclockwise phase rotation of the stator flux. If the direction of stator phase rotation were reversed, the vanes would also have to be reversed, so that the spider arm parts of the vanes are faced in a direction opposite to the direction of phase rotation. Such arrangement may be seen by holding Fig. 1 up to the light and viewing it through the paper from the back. The invention is believed to be applicable to polyphase power factor meters generally and is not confined to meters in which the stator rotating magnetic field is produced by a three-phase winding.

It is to be noted that in all cases the rotor vanes are made nonsymmetrical in a rotative direction and this nonsymmetry is so correlated with the direction of phase rotation of the polyphase rotating magnetic field as to reduce or minimize the error in question which is due to a motor torque in the direction of the rotating magnetic field. This motor torque is evidently largely a hysteresis torque but there may also be some reluctance motor torque. In the prior art power factor meter this torque, whatever its nature, evidently varied with the amount of single phase magnetizing flux in the rotor or at least the motor torque and the power factor positioning torque varied with respect to each other with different degrees of single phase magnetizing flux. My invention evidently does not eliminate this motor torque but it does so change the various torque relations with changes in rotor magnetization flux that the error produced by the motor torque is greatly minimized.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A power factor meter having a stationary polyphase winding for producing a two-pole rotating magnetic field, a two-pole magnetic vane armature rotatively mounted within the influence of said magnetic field, a single phase winding for magnetizing said armature, connections for energizing said windings in fixed phase relations with the voltage and current respectively of a power circuit, said magnetic vane armature being nonsymmetrical in a rotative direction with its nonsymmetry so correlated with the direction of phase rotation of the rotating magnetic field of the stator as to minimize errors in such meter caused by the directional rotative torque producing action of the rotating magnetic field on the armature.

2. A power factor meter having a stationary polyphase winding for producing a two-pole rotating magnetic field, a two-pole magnetic armature rotatively mounted within the influence of said field, a single phase winding for magnetizing said armature, connections for energizing said windings in fixed phase relations with the voltage and current of a power circuit, the armature member having a pair of magnetic vanes each consisting of a spider arm portion and a rim body portion the greater portion of which extends from the spider arm portion in the same direction as the direction of phase rotation of said rotating magnetic field, said vane construction rendering the armature magnetically nonsymmetrical in a rotative direction and reducing the tendency of said armature to have its rotative position changed by rotating magnetic field torque action.

3. A power factor meter comprising a polyphase winding for producing a two-pole rotating magnetic field, a two-pole magnetic armature rotatively mounted within the influence of said field, a single phase winding for magnetizing said armature, connections or energizing said windings in fixed phase relation to the voltage and current respectively of a power circuit, said armature having a pair of substantially sickle-shaped magnetic vanes with the sickle handle portions forming the spider arms and the sickle blade portions forming outer rim portions of such vanes with such rim portions extending from the spider portions in the same direction as that of the phase rotation of the rotating magnetic field, the rim portions being of the order of one-third the cross sections of the spider arm portions and the radius at the extremity of the rim portion being less than at the spider arm portion, said construction serving to reduce the error of the meter caused by the tendency of the rotating magnetic field to produce motor torque on the armature.

4. A power factor meter having a stationary polyphase winding for producing a two-pole rotating magnetic field, a two-pole magnetic vane armature rotatively mounted within the influence of said magnetic field, a single phase winding for magnetizing said armature, connections for energizing said windings in fixed phase relations with the voltage and current respectively of a power circuit, the vanes of said armature each being of general sector shape and lying in planes perpendicular to the axis of rotation and each having a slot cut therein from a point near the axis of rotation to a point near the rim so as to divide the sector into a spider arm portion to which the remaining portion of the sector is fastened by a reduced section near the rim, the slots extending from that side of the sector-shaped vanes which face in the same direction as that of the phase rotation of the rotating magnetic field, said vane construction serving to reduce the error of said instrument which is due to the motor torque action of the rotating magnetic field on the armature.

5. A power factor meter having a stationary polyphase winding for producing a two-pole rotating magnetic field, a two-pole magnetic vane armature rotatively mounted within the influence of said magnetic field, a single phase winding for magnetizing said armature, connections for energizing said windings in fixed phase relations with the voltage and current respectively of a power circuit, the vanes of said armature each being of general sector shape and lying in parallel planes perpendicular to the axis of rotation and each having a slot cut therein from one side adjacent the axis of rotation to a point adjacent the rim dividing the sectors into a radial spider arm portion and a rim body portion secured to the spider arm portion at its outer end, and a flat shading coil surrounding the rim body portion and lying in such slot with its axis tangent to a circle whose center is in the axis of rotation of the armature, the shading coil side of said vanes facing in the direction of the phase rotation of the rotating magnetic field, said arrangement serving to reduce errors occasioned by motor torque action of the rotating magnetic field acting on the armature.

NORVAL P. MILLAR.